United States Patent [19]

Blanchard et al.

[11] Patent Number: 5,504,995
[45] Date of Patent: Apr. 9, 1996

[54] PROCESS FOR FITTING AT LEAST ONE METAL PIECE WHICH HAS AT LEAST ONE CYLINDRICAL BORE AROUND A METAL TUBE

[75] Inventors: Pierre Blanchard, Meylan; Henri Gueydan, Moirans; André Malherbe, Vitry-En-Perthois, all of France

[73] Assignee: Sintertech, Courbevoie, France

[21] Appl. No.: 155,299

[22] Filed: Nov. 22, 1993

[30] Foreign Application Priority Data

Nov. 24, 1992 [FR] France .................................... 92 14348

[51] Int. Cl.$^6$ .................................................. B23P 15/00
[52] U.S. Cl. .................................................. 29/888.1; 29/523
[58] Field of Search .................................. 29/888.1, 523; 74/569, 568; 123/90.15, 90.17, 90.18, 90.6

[56] References Cited

U.S. PATENT DOCUMENTS

| | | | |
|---|---|---|---|
| 4,763,503 | 8/1988 | Hughes et al. | 74/567 |
| 5,079,836 | 1/1992 | Swan | 29/888.1 |
| 5,085,099 | 2/1992 | Hughes | 29/888.1 |
| 5,157,832 | 10/1992 | Hughes | 74/567 |
| 5,195,229 | 3/1993 | Hughes | 29/888.1 |
| 5,220,727 | 6/1993 | Hochstein | 29/888.1 |
| 5,280,675 | 1/1994 | Orsini | 29/888.1 |

FOREIGN PATENT DOCUMENTS

| | | | |
|---|---|---|---|
| 119112 | 9/1994 | European Pat. Off. | 74/567 |
| 3302762 | 2/1984 | Germany | 74/567 |
| 8490141 | 1/1986 | Germany | 74/567 |
| 1117816 | 6/1968 | United Kingdom | 74/567 |
| 2185553 | 7/1987 | United Kingdom | 74/567 |

*Primary Examiner*—Irene Cuda
*Attorney, Agent, or Firm*—Dennison, Meserole, Pollack & Scheiner

[57] ABSTRACT

A process for fitting at least one metal piece, which has at least one cylindrical bore, around a metal tube, in particular a metal cam shaft, as used, for example, in an internal combustion engine. The process includes clamping the metal piece in the assembly unit and introducing the metal tube into the bore of the metal tube with one end of the tube bearing upon the retractable stop. After expansion of the tube to fix the one metal piece on the tube, and the retractable stop is retracted before any additional metal pieces are fitted to the tube.

5 Claims, 2 Drawing Sheets

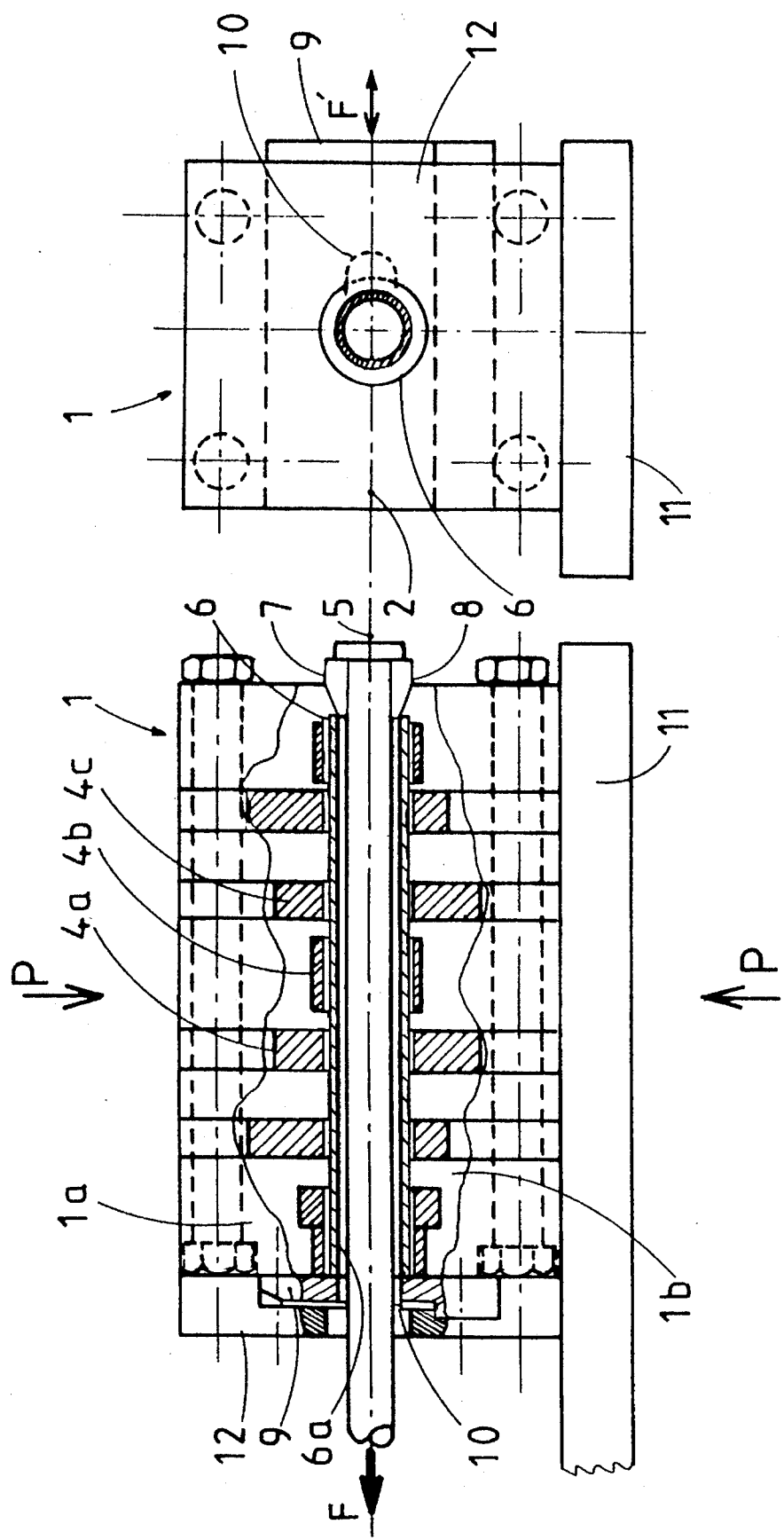

PROCESS FOR FITTING AT LEAST ONE METAL PIECE WHICH HAS AT LEAST ONE CYLINDRICAL BORE AROUND A METAL TUBE

The invention is concerned with a process and a device for fitting at least one metal piece which has at least one cylindrical bore around a metal tube, in particular a metal cam shaft used, for example, in a motor car.

DESCRIPTION OF RELATED ART

The patent U.S. Pat. No. 4,882,825 discloses a process for fitting at least one metal piece which has a bore around a metal tube, in which the tube is introduced with clearance into said bore, and said tube is expanded from its inside until the fitment within the bore occurs. With this process, the expansion operation is carried out by filling the tube with a fluid which is pressurised in such a way that it deforms the tube which penetrates into grooves in the bore of the metal piece, these grooves preferably having a circumferential width of at least 1.5 times the thickness of the tube in order to avoid the formation of cracks which were noted in previous pieces of this kind or "cams" with smaller grooves. With this process, the expansion operation takes place simultaneously for the entire length of the tube, whether it is a question of fitting one single piece around the tube or of fitting spaced apart pieces.

German Patent Application DE-A-3302672 also discloses a similar process in which radial expansion of the tube is carried out by passing a tube expander inside the tube.

However, if a tube has a plurality of pieces, which is typical in the case of a cam shaft, it has been seen that after the fitment operation by radial expansion and during withdrawal of the unit used, the assembly becomes deformed which makes it necessary either to straighten the tube and most often mill it, or to make final adjustments to the cams because of their varying angular positions after the fitment operation.

SUMMARY OF THE INVENTION

The Applicant has perfected a device and a fitment process which avoid such corrective measures, at least.

The device according to the invention comprises the following elements:
1. an assembly unit or mounting block
2. the pieces which are to be joined to the tube
3. the tube
4. a tube expander with its displacement and coupling device
5. a retractable stop.

DESCRIPTION OF THE INVENTION

The assembly unit is in two parts and includes the receiving means for precision machined pieces to be fitted to the tube and which pieces are fitted along the tube and oriented at an angle relative to one another. The pieces are either cams, or bearings, or drive members (pulleys . . . ) etc.

The pieces to be fixed to the tube are each provided with at least one cylindrical bore which is slightly greater in diameter than the diameter of the tube, typically +0.04 to +0.2 mm.

When the pieces are in their receiving means and the assembly unit is closed, the bores of said pieces are co-axial.

To increase the couple transmitted and to avoid defects which are harmful to mechanical strength, particularly fatigue, the tube receiving bores of the pieces to be fitted to the tube are provided with 3 to 15 longitudinal grooves; 3 to 12 grooves are most frequently used, which are distributed uniformly around the circumference of the surface defining the bore.

It has actually been noted that when the bore was smooth i.e., not grooved, from the place where the tube expander entered the portion of the tube surrounded by a bore of the piece to the place where it emerged from that portion, a small annular internal fold was formed by the tube expander, and that fold often became transformed into an annular folded back portion or tuck at the end of the piece, the tube wall no longer being in a compressed state. A folded back portion of this kind reduces the resistance to fatigue of the tube provided with the fitted pieces, typically a tubular cam shaft. It has surprisingly been noted that by providing the bore of one of the previous metal pieces with small spaced apart grooves it was possible to completely avoid the previous annular folded back portion. Furthermore, the juncture of each groove to the smooth parts of the bore, is preferably provided with curves of a radius of between 0.1 and 0.5 mm, which considerably increases the resistance of the joint from becoming released between the piece and the tube, being between 50 and more than 150 N.m, for example, due to at least three spaced apart grooves with a joining radius of 0.2 to 0.3 mm. 3 to 15 grooves are thus used, more frequently 5 to 12 grooves, which are distributed over the periphery of the bore and whose internal width beyond said curved joining portions is typically between 0.4 and 0.9 mm. Since the metal tube is usually between 1 and 2.5 mm in thickness, it will be appreciated that the grooves are much smaller than those of the prior art cited, and that they play a different part, the metal of the tube only flowing there slightly, with the joining portions curved by the groove only imprinting themselves slightly into the tube. The effect of slight local flow does not by itself give a correct explanation of the disappearance of the annular contour, and the disappearance of this remains surprising.

The pieces, in particular, cams and bearings, to be fixed to the tube are usually treated in such a way that an elastic Rp 0.2 is greater than 500 MPa and in such a way that a rupture elongation is obtained which is greater than 2%.

The tube is a circular crosssection, commercially available tube, usually made of steel, which is between 1 and 2.5 mm in thickness. It is also typically made of steel with an elastic limit of 0.2% which is equal to at least 300 MPa. The thickness of 1 mm is linked to the desired rigidity, while one of 2.5 mm is for the sake of simplicity of the expansion operation generally used. Elongation of the tube by plastic expansion deformation is usually mope than 10%, and that, in itself, is sufficient.

The tube expander which is usually cylindrical-conical is fixed permanently to the end of a rod, with the other end of the rod being able to be coupled to the device for axial movement such as, for example by a hydraulic jack.

The entry cone of the tube expander has a ½ angle to the summit which is usually between 5° and 10°. The overall diameter of the tube expander is greater by 0.1 to 0.5 mm than the internal diameter of the tube. The sum of the diameter of the tube expander and of twice the thickness of the tube is greater by at least 0.04 mm than that of the bore of the pieces to be fitted to the tube. It is preferably displaced by traction to prevent parasitic buckling of the tube.

The device also has a stop at the downstream end of the tube in the direction of displacement of the tube expander, which stop is able to retract, either by a translatory movement, or by rotation, and the role of this stop will emerge in the description given hereinafter relating to the process.

The process according to the invention comprises the following operations:

a) the assembly unit is placed between the two panels of a press, and each of the parts is fixed to the upper panel and lower panel. The press is preferably a hydraulic press, the clamping force of which can be controlled;

b) the various pieces are placed in their receiving means in the lower part;

c) the unit is closed by the application of a clamping pressure in excess of 1 MPa;

d) the tube is introduced into the bores until it bears against the retractable stop;

e) the rod of the tube expander is introduced into the tube, and it is coupled to the displacement device;

f) the tube expander is displaced axially until it passes completely into the bore of the first piece being fixed to the tube;

g) the stop is retracted;

h) expansion of the tube takes place up to the free end of the tube;

i) the assembly unit is opened;

j) the finished piece is withdrawn.

One of the important features of the invention is that after the 1st piece has been fixed by expansion of the tube, the downstream end of the tube is released, which allows that free part of the tube to rotate freely and to expand freely in the axial extent when the tube expands. Also, the distortion caused either by the existence of residual stresses in the tube, or by slight eccentricity, or due to some other cause, is eliminated, unlike with prior art methods where the two ends of the tube are fixed.

As a result, the pieces retain the axial, longitudinal and angular positions which they have in the assembly unit. Therefore, it is no longer necessary to either straighten or correct the final product.

Moreover, it has been noted that when the tube is expanded, the pieces themselves are cold calibrated into their receiving means, which makes a particular contribution to the production of accurate geometry and an improved surface state.

The anti-release coupling of the pieces to the tube is usually in excess of 150 N.m.

The invention will be better understood with the aid of the following example relating to the manufacture of a cam shaft and which is illustrated in the drawings.

BRIEF DESCRIPTION OF THE DRAWINGS

FIG. 1 is an illustration of a general elevational view of the device according to the invention, partially in axial section.

FIG. 2 shows a side elevational view of the device according to the invention.

Figure 3:
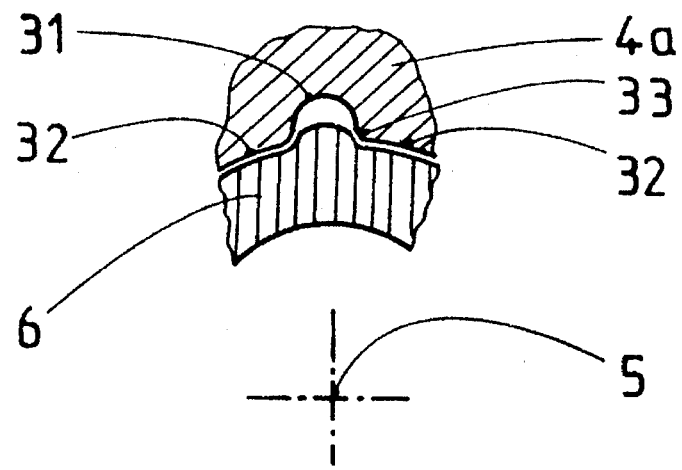
FIG. 3 shows a cross-sectional view of the connection between a piece with grooves and the tube.

The device according to the invention comprises an assembly unit 1 which is in two parts 1a and 1b and which are assembled along the joining plane 2 which usually passes through the axis 5.

The assembly unit 1 is placed between the 2 panels of a hydraulic press which apply a pressure P; each part 1a and 1b is fixed to each of the panels by known means, not shown.

The pieces such as 4a, 4b, 4c are placed in the assembly unit 1, with the bores on the axis 5 of the tube 6.

The device also comprises a tube expander 7 which is carried by a rod 8 which is connected to a device, not shown, for displacement in the direction of the arrow F.

A removable stop 9 is placed at the downstream end 6a of the tube 6. It is able to be retracted by a translatory movement in the direction of the arrow F'.

The stop 9 comprises an opening 10 in the form of a keyhole, the widest part of which is in diameter slightly greater than the external diameter of the tube 6, and the narrow part of which is smaller than the internal diameter of the tube 6. It slides into the panel denoted by the reference numeral 12. The assembly unit 1 is fixed to a base plate 11 which also carries the traction jack (not shown).

First Example of Fitment According to the Invention

As shown in FIGS. 1 and 2, a steel tube 6, which, prior to expansion, is 1.2 mm in thickness and has an elastic limit E of 0.2% equal to 400 MPa. Prior to expansion, the internal and external diameters of the tube are 23.96 mm and 26.36 mm respectively.

The metal cams 4a, 4c which are fixed to the tube 6 were obtained by sintering and are made of steel with 0.85% Mo. The diameter of their cylindrical bore is 26.54 mm, and they are 14 mm in thickness. The tube expander 7 is made of sintered tungsten carbide; it comprises a frustoconical entry portion which is inclined at 10° to the axis 5, starting with a diameter of 23.6 mm and being joined to its cylindrical portion of diameter 24.25 mm.

The pressure applied by the panels of the hydraulic press is 1.5 MPa. The resistance of the cams 4a, 4c to being rotated on the tube 6 to which they have been fitted was found to be 70 N.m.

Second Example of Fitment According to the Invention

Metal cams 4a, 4c were used of the same kind and with the same geometry as before, the only change being that the bore of each cam 4a, 4c has ten uniformly distributed longitudinal grooves 31. The grooves 31 have a contour which is semicircular in cross-section, see FIG. 3, with a radius of 0.4 mm joined to the smooth parts 32 of the bore by way of curved portions 33 of radius 0.3 mm.

Three of these cams 4a, 4b comprising grooves 31 were fitted, and spaced at 20 mm apart, to a tube of the same kind as the tube 6, these 3 cams being kept with their bores in alignment and at different orientations of their cam surfaces, the assembly unit (1, 1a, 1b) of steel having a hardness of 45 HRc.

The pressure applied by the panels of the hydraulic press at the level of the joining plane (2) was 1.5 MPa.

The following was noted about the assembly produced after expansion of the tube:

a) the cams have a discontinuous glaze on their circumference, revealing calibration due to each cam expanding;

b) the anti-release by rotation of the couple of each cam is 230 N.m;

c) the orientations relative to the three cams remain unchanged after the assembly unit has been taken apart.

Other embodiments of the invention can be envisaged.

In particular, as shown in FIG. 1, a steel bearing 4b fixed by expansion of the tube to the tubular shaft 6 like the cams 4a, 4c which surround it.

Figure 4:
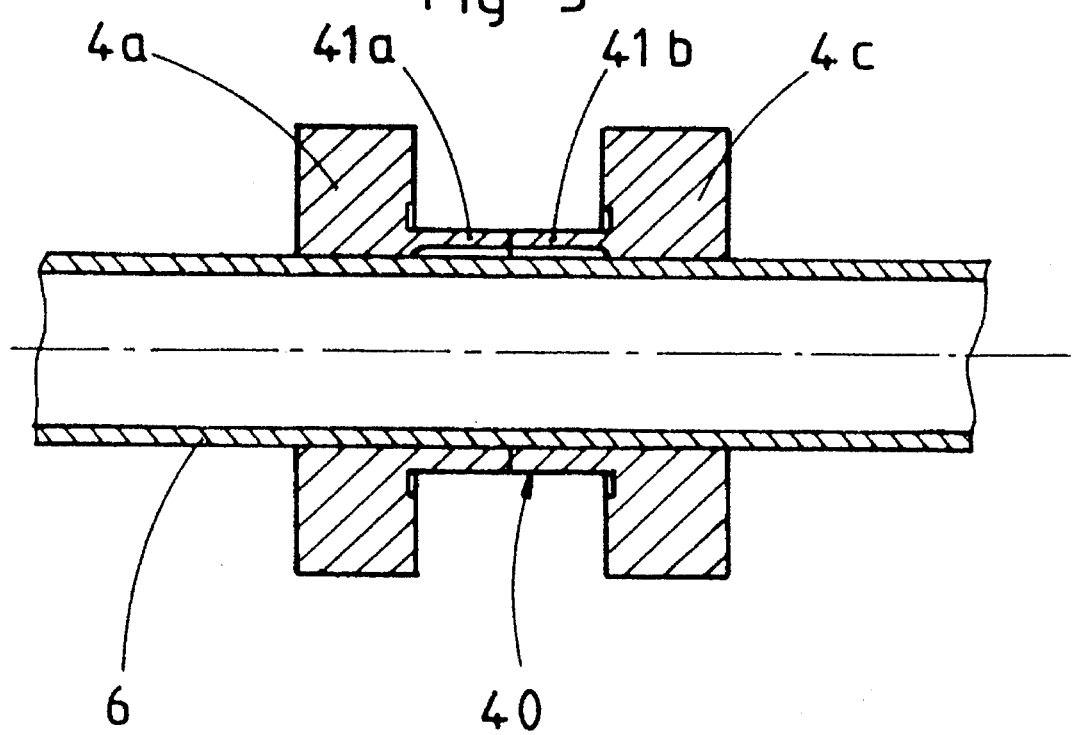
FIG. 4 is an axial section through a fragmentary portion of other embodiments of the invention.

As shown in FIG. 4, the bearing 40 is formed by the juxtaposition of the lateral parts 41a, 41c of the cams 4a and 4c.

This part can be expanded (bottom part of FIG. 4), of not (top part of FIG. 4) on the tube 6.

In addition to the advantages already mentioned before, this embodiment is economically advantageous compared with the prior art (elimination of the straightening and/or correcting operations); it is easily automated, which helps make it productive and profitable.

The invention is mainly used for the production of cam shafts.

What is claimed is:

1. A process for fitting at least one metal piece provided with at least one bore on a tube having a downstream end and an upstream end and a longitudinal axis, comprising the steps of:
   a) providing means for holding said at least one metal piece, said holding means further comprising a retractable stop located at the downstream end of the tube;
   b) placing said at least one metal piece in the holding means, and closing the holding means, said at least one metal piece being held in said holding means by applying a clamping pressure greater than 1 MPa;
   c) introducing the tube into said at least one bore of said at least one metal piece and moving the tube in a downstream direction until the tube bears on the retractable stop;
   d) introducing a tube expander into the tube from the upstream end of said tube and moving the tube expander along the longitudinal axis of the tube in the downstream direction until the tube expander expands the tube thereby fitting said at least one metal piece to said tube;
   e) retracting the stop and continuing the movement of the tube expander outwardly of the downstream end of the tube; and
   f) removing the clamping pressure, opening the holding means, and withdrawing said tube and said at least one metal piece which has been fitted on said tube.

2. A process according to claim 1, wherein said clamping pressure is applied by placing said means for holding between upper and lower panels of a press, fixing an upper part of said means to the upper panel of the press, fixing a lower part of the means to the lower panel of the press and closing the press to apply the clamping pressure.

3. A process according to claim 2, wherein the press is a hydraulic press having controllable clamping force.

4. A process according to claim 2, wherein a joining plane is defined at the longitudinal axis of the tube, and said press applies a pressure at said joining plane greater than 1 MPa.

5. A process according to claim 1, wherein said at least one metal piece is provided with spaced apart grooves in a surface defining its at least one bore, and wherein the spaced apart grooves are disposed in general alignment with the longitudinal axis of the tube.

* * * * *